United States Patent
He et al.

(10) Patent No.: US 6,835,689 B1
(45) Date of Patent: Dec. 28, 2004

(54) NH₃ GENERATION CATALYSTS FOR LEAN-BURN AND DIESEL APPLICATIONS

(75) Inventors: Lin He, Horseheads, NY (US); Steven B. Ogunwumi, Corning, NY (US)

(73) Assignee: Corning Incorporated, Corning, NY (US)

( * ) Notice: Subject to any disclaimer, the term of this patent is extended or adjusted under 35 U.S.C. 154(b) by 81 days.

(21) Appl. No.: 09/685,384

(22) Filed: Oct. 10, 2000

(51) Int. Cl.⁷ .............................................. B01J 23/10
(52) U.S. Cl. ...................................... 502/302; 502/303
(58) Field of Search ................................ 502/325, 326, 502/313, 329, 343, 321, 339, 319, 340, 303, 350, 304, 345, 353, 324, 344

(56) References Cited

U.S. PATENT DOCUMENTS

| | | | | |
|---|---|---|---|---|
| 3,907,968 A | * | 9/1975 | Kobylinski et al. | 423/213.5 |
| 3,915,896 A | * | 10/1975 | Oliver | 502/250 |
| 4,003,976 A | * | 1/1977 | Komatsu et al. | 423/213.5 |
| 4,064,073 A | * | 12/1977 | Pomot | 502/314 |
| 4,537,873 A | * | 8/1985 | Kato et al. | 502/241 |
| 5,128,306 A | * | 7/1992 | Dettling et al. | 423/213.5 |
| 5,863,508 A | | 1/1999 | Lachman et al. | |
| 5,895,636 A | * | 4/1999 | Nguyen et al. | 208/262.1 |
| 5,899,679 A | * | 5/1999 | Euzen et al. | 423/210 |
| 5,935,529 A | * | 8/1999 | Saito et al. | 422/177 |
| 6,022,825 A | * | 2/2000 | Andersen et al. | 502/303 |

OTHER PUBLICATIONS

Balmer et al., Diesel NOx Reduction on Surfaces in Plasma, Paper 9825H, 7 pgs.
Kuroda et al., Study of NH3 Formation and Its Control in the NOx Control System, p. 41–53.
Fishel et al., Ammonia Synthesis Catalyzed by Ruthenium Supported on Basic Zeolites, Journal of Catalysis 163, p. 148–157, 1996.
Zhong et al., Effect of Ruthenium Precursor on Hydrogen–Treated Active Carbon Supported Ruthenium Catalysts for Ammonia Synthesis, Inorganics Chimica Acta 280, 1998, p. 183–188.
Takiguchi et al. "Catalyic Engine" NOx Reduction of Diesel Engines with New Concept Onboard Ammonia Synthesis System, 8 pgs.
Becue et al., Effect of Cationic Promoters on the Kinetics of Ammonia Synthesis Catalyzed by Ruthenium Supported on Zeolite X, Journal of Catalysis 179, p. 129–137, 1998.
Aika et al., On–Site Ammonia Synthesis in De–NOx Process, Catalysis Today, 10, 1991, p. 73–80.
Jacoby, Getting Auto Exhausts to Pristine, Jan. 25, 1999, C&EN, p. 36–44.
Iwamoto et al., NOx Emission Control in Oxygen–Rich Exhaust Through Selective Catalytic Reduction by Hydrocarbon, Imech E, 1993, p. 23–33.
Gilot et al., A Review of NOx Reduction on Zeolitic Catalysts Under Diesel Exhaust Conditions, Fuel 1997, vol. 76 No. 6, p. 507–515.
Fritz et al., The Current State of Research on Automotive Lean NOx Catalysis, Applied Catalysis B: Env.1 13; 1997; 1–25. Lean NOx Catalyst, DieselNet Technology Guide, p. 1–8.

* cited by examiner

Primary Examiner—Stanley S. Silverman
Assistant Examiner—Edward M. Johnson
(74) Attorney, Agent, or Firm—Anca C. Gheorghiu

(57) ABSTRACT

A catalyst for converting $NO_x$ in exhaust gases from internal combustion engines to $NH_3$ includes a perovskite material or a metal oxide impregnated with a noble metal, the metal oxide comprising at least one selected from $Fe_2O_3$, $Cr_2O_3$, $MgO$, $La_2O_3$, and $CeO_2$, and the noble metal comprising at least one selected from Pt, Pd, Ir, Rh, and Ru.

5 Claims, 7 Drawing Sheets

NH₃ GENERATION CATALYSTS FOR LEAN-BURN AND DIESEL APPLICATIONS

BACKGROUND OF THE INVENTION

1. Field of the Invention

This invention relates to methods for reducing nitrogen oxides ($NO_x$) emissions from internal combustion engines. More specifically, the invention relates to a catalyst and method for converting $NO_x$ in exhaust gases to $NH_3$.

2. Background Art

One of the biggest problems with internal combustion engines today is how to convert environmentally harmful gases and particulates expelled from the engines to safe and environmentally benign products. An internal combustion engine transforms gasoline, diesel, or some other type of fuel into work or motive power through explosive combustion reactions. These reactions also produce harmful byproducts such as carbon monoxide, hydrocarbons (in this application, hydrocarbons refer to short-chain hydrocarbons commonly found in gasoline, diesel or exhaust from internal combustion engines), $NO_x$ and particulates. $NO_x$, which are mixtures of oxides of nitrogen, constitute a major component of these byproducts.

Statistics show that sixty to eighty percent of nitrogen oxides in the atmosphere is produced by mobile sources, whereas the remainder is produced by stationary internal combustion engines. Ever-tightening regulations from governments have kept an unrelenting pressure to develop more efficient engines which produce less pollution. Researchers worldwide have been struggling long and hard to develop such engines. However, this objective has proven difficult to achieve. For example, if engine efficiency is increased by increasing air to fuel ratio so that fuel is completely consumed, as in lean-burn engines, carbon monoxide, hydrocarbon, and particulate emissions are reduced. However, this change is accompanied by a corresponding increase in nitrogen oxide emission. Conversely, if the combustion process is modified to reduce nitrogen oxide production, i.e., by running the engines under rich-burn (fuel excess) conditions, more particulates and hydrocarbons are emitted.

Consequently, researchers have focused their efforts on controlling the emission of harmful materials. These emission control efforts have led to the development of catalytic converters and other catalysts that are very effective in controlling harmful emission. For example, three-way catalysts such as [Pt and/or Pd+Rh]/$CeO_2$—$Al_2O_3$ and selective catalytic reduction (SCR) catalysts such as $V_2O_5$—$TiO_2$ and Cu-zeolite have been successfully employed to convert $NO_x$ to innocuous gases.

In the three-way catalysts, rhodium (Rh) can selectively reduce $NO_x$ to $N_2$ in stoichiometric ratio in the absence (or at extremely low concentrations) of oxygen. However, the presence of oxygen rapidly deteriorates the performance of these three-way catalysts. Therefore, this technology is not suitable for controlling $NO_x$ emission form lean-burn engines. Furthermore, this technology is ineffective in controlling $NO_x$ emission from diesel engines because diesel engines function at lower temperatures, but the available catalysts require high temperatures for optimal performance.

One of the $NO_x$ emission control technologies under consideration by diesel and lean-burn engine makers is an $NO_x$ storage catalyst with intermittent reduction. With this technology, $NO_x$ in exhaust gases is temporarily adsorbed on the catalyst during a lean-burn cycle. The engine is intermittently switched to a rich-bum cycle to reduce the adsorbed $NO_x$ to $N_2$ in the absence of oxygen. These catalysts, however, suffer from deactivation by $SO_2$ poisoning from sulfur in diesel fuel.

Another approach being considered for $NO_x$ emission control in diesel and lean-burn engines is SCR with $NH_3$/urea. SCR catalysts such as $V_2O_5$—$TiO_2$, or [Fe, Cu, etc.]—zeolite, or natural $\alpha$-$Fe_2O_3$ with or without another metal as disclosed in U.S. Pat. No. 4,138,368 issued to Makoto Kiyomiya for example, can use external ammonia to reduce $NO_x$ to $N_2$ and $H_2O$. FIG. 1 illustrates a common setup for converting $NO_x$ to harmless components using SCR. In this setup, an ammonia tank 20 is connected to a catalytic unit 26 in which $NO_x$ are converted to $N_2$ and $H_2O$ by reacting with $NH_3$ from tank 20 in the presence of an SCR catalyst. After reacting with ammonia, the exhaust gases can then be safely expelled through the exhaust pipe 24 into the atmosphere. This $NO_x$ reduction technique is widely used with conventional electric power plants and other stationary engines. The toxicity and manipulation problems of ammonia, however, has made use of the technology in automobiles or other mobile engines impracticable.

U.S. Pat. No. 5,863,508 issued to Lachman et al. describes a multi-stage catalytic reactor system which allows ammonia to be synthesized onboard a vehicle and then used to reduce $NO_x$ to innocuous products. The reactor system includes two units, each of which includes multiple open-ended cells. A portion of the cells in the first unit contains a first stage catalyst, which typically contains 0.01%–5% noble metal (e.g., Pt) on a support (20%–50% Cerium from $CeO_2$ and alumina for the balance). Exhaust gases from combustion are passed through the first unit so that a portion of the $NO_x$ in the exhaust gases is reduced to ammonia by the first stage catalyst. The modified gas mixture is then passed to the second unit, wherein the ammonia in the modified gas mixture is reacted with the remaining $NO_x$ to yield a converted gas mixture. An external source of ammonia is not needed because the ammonia is generated in the first unit. The passage of the exhaust gases through the first and second units results in conversion of $NO_x$, CO, and hydrocarbons to environmentally benign products.

A similar approach as disclosed in U.S. Pat. No. 6,047,542 issued to Kinugasa et al. and its related patents involves separating engine cylinders into two groups; the first group is regulated to run under rich-burn conditions and the second group under lean-burn conditions. $NO_x$ in the exhaust gas from the first group (rich-burn cylinders) is reduced by a three-way catalyst to produce $NH_3$, which is then reacted with $NO_x$ in the exhaust gas from the second group (lean-burn cylinders) to produce innocuous products on a $NH_3$ adsorbing-oxidizing catalyst. The need to separate engine cylinders into two groups is due to the fact that the prior art $NH_3$ generation catalysts are not suitable for lean-burn or diesel application.

SUMMARY OF THE INVENTION

In one aspect, the invention relates to a catalyst for converting $NO_x$ in exhaust gases to $NH_3$ which comprises at least one metal oxide impregnated with at least one noble metal, the metal oxide being selected from a group consisting of $Fe_2O_3$, $Cr_2O_3$, MgO, $La_2O_3$, ZnO, $TiO_x$, and $CeO_2$, and the noble metal being selected from a group consisting of Pt, Pd, Ir, Rh, and Ru.

In another aspect, the invention relates to a catalyst for converting NO, in exhaust gases to $NH_3$ which comprises one or more compounds represented by the formula $AB_{1-x}M_xO_3$, wherein A is a rare earth, B is a transition metal, and M is a noble metal.

In another aspect, the invention relates to a catalytic unit comprising at least one catalyst of the present invention.

In yet another aspect, the invention relates to a method of generating $NH_3$ from $NO_x$ comprising passing a stream of gas which comprises $NO_x$, oxygen, and at least one reductant through a catalyst of the present invention.

Other aspects and advantages of the invention will be apparent from the following description and the appended claims.

DETAILED DESCRIPTION OF THE INVENTION

Embodiments of the invention provide catalysts and methods for $NO_x$ reduction using such catalysts. Several catalysts are disclosed that can generate $NH_3$ in the presence of oxygen. The potential applications of the catalysts include control of harmful $NO_x$ emission in the exhaust of lean-burn or diesel engines. The ammonia generated by the disclosed embodiments of the invention can react with NO, in the exhaust to generate nitrogen and water, which can then be safely discharged into the atmosphere.

Figure 3:
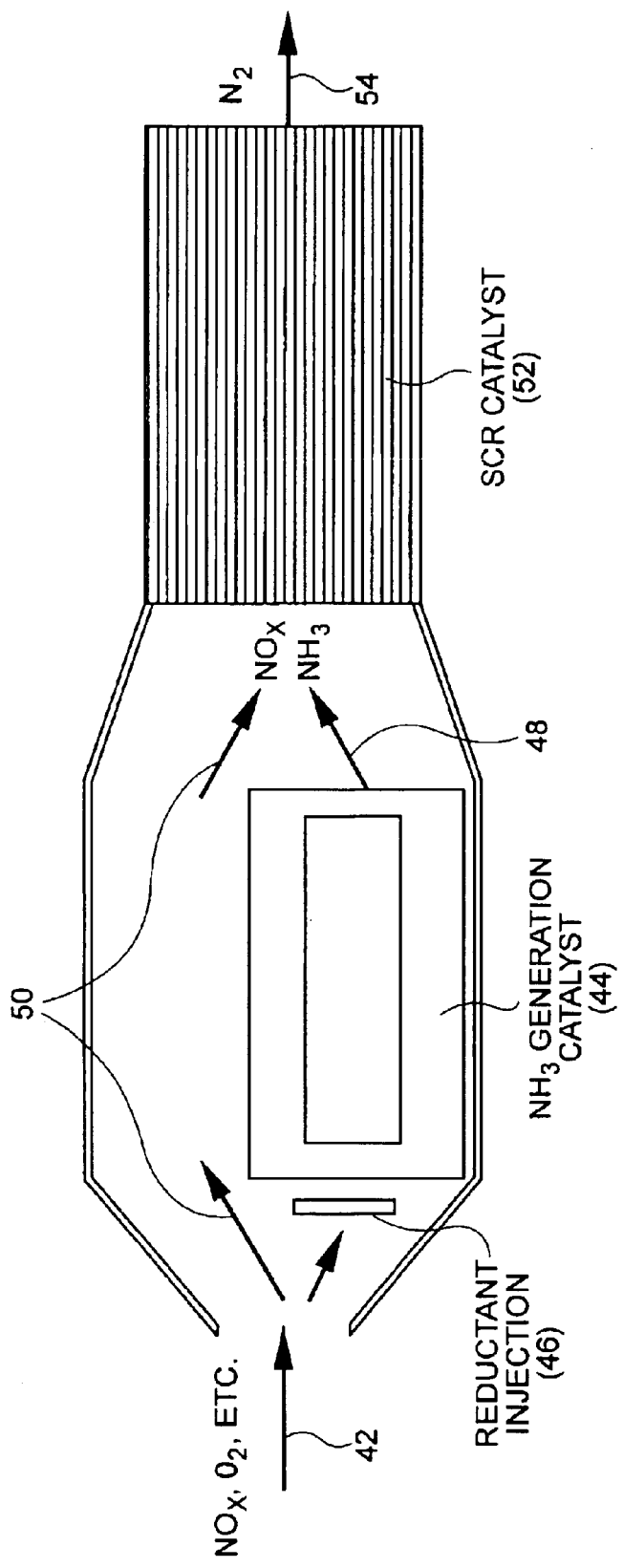
FIG. 3 is a graph illustrating a setup for using an $NH_3$ generation catalyst in conjunction with an SCR catalyst for $NO_x$ abatement.

FIG. 3 illustrates one possible setup for using such an $NH_3$ generation catalyst in conjunction with an SCR catalyst to reduce $NO_x$ in the exhaust gas. In this setup, a portion of the exhaust gas 42 from an internal combustion engine is passed through the $NH_3$ generation catalyst 44 which is equipped with a reductant injection device 46. Diesel, gasoline, hydrocarbons, or hydrogen can be used as the reductants and introduced through device 46. Gas 48 exiting from the catalyst 44 contains $NH_3$ and is reacted with the remainder of the exhaust gas 50 in the SCR catalyst 52. The final product from the second catalytic reaction will comprise mostly $N_2$ 54 instead of $NO_x$. Other setups as disclosed in U.S. Pat. No. 5,863,508, issued to Lehman et al. and assigned to the same assignee as the present application, may also be used. This patent is herein incorporated by reference as filed.

Embodiments of the invention provide $NO_x$ reducing catalysts that are sufficiently active at low temperatures, and are durable even in exhaust gases which contain water vapor and sulfur dioxide. The ability of the catalysts to function at relatively low temperature is important for diesel application because diesel engines typically run at lower exhaust gas temperatures. The catalysts are also resistant to $SO_2$ poisoning. This stability is important for diesel application because diesel fuel exhaust often contains $SO_2$ from the sulfur in the fuel itself.

In general, the catalysts of the invention comprise a noble metal or combination of noble metals supported on metal oxides or perovskite materials. For catalysts which include noble metals supported on metal oxides, the preferred noble metals are platinum (Pt), palladium (Pd), iridium (Ir), rhodium (Rh), and rhthenium (Ru). The preferred metal oxides are, $Fe_2O_3$, $Cr_2O_3$, MgO, $CeO_2$, $La_2O_3$, ZnO, and $TiO_x$. Some embodiments of the invention may additionally include up to 5 percent by weight of one or more transition metals, preferably Cu, Zn, Ni, Mo, Ir, Co, Fe, Cr, or Mn. All transition metal additions in the examples which follow are accomplished by adding these metals in the form of water-soluble salts, e.g., nitrate, acetate, or hydroxide. Some embodiments may include up to 5 percent by weight of alkali metals or alkaline earth metals, preferably Ba, Cs, or K. Some embodiments may include up to 5 percent by weight of rare earth oxides, preferably $La_2O_3$ or $CeO_2$. In addition, some embodiments may include a combination of these additional metals and/or rare earth oxides.

For catalysts which include noble metal supported on perovskite materials, the noble metal is impregnated in perovskite materials having a general formula of $ABO_3$, where A is a rare earth and B is a transition metal. The impregnation is achieved by replacing portions of the transition metal in these perovskite materials with the noble metal. Therefore, the resultant perovskite materials have a general formula of $AB_{1-x}M_xO_3$, where A is a rare earth, B is a transition metal, M is a noble metal, and x is between 0 and 1. Preferably, M is Pt and x is between 0 and 0.3. This low level substitution prevents any significant structural change in the original perovskite materials.

Figure 1:
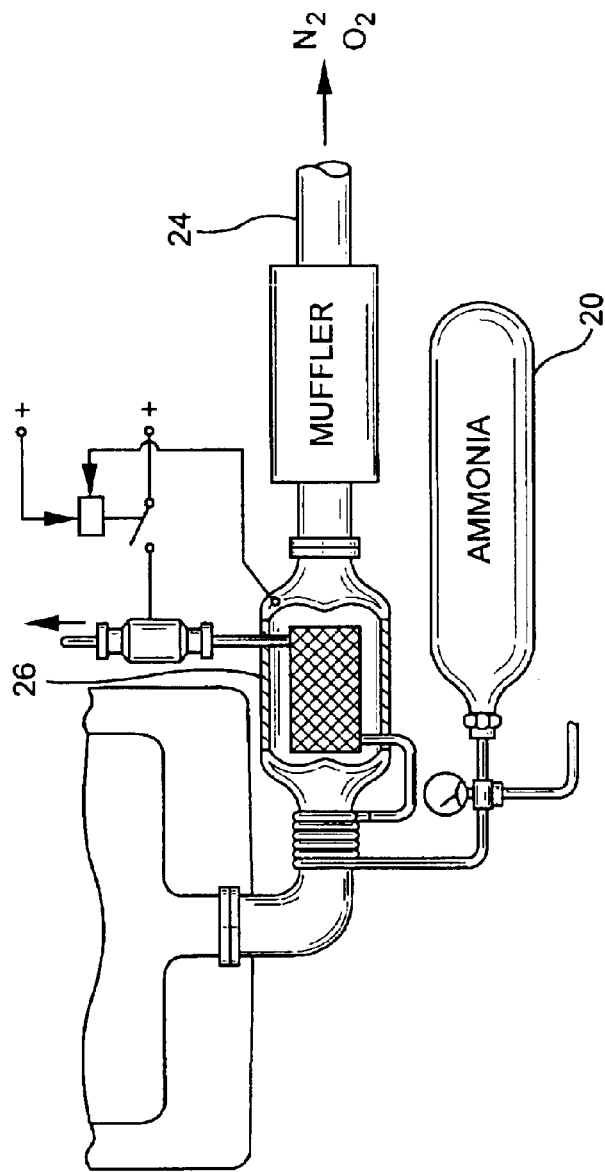
FIG. 1 is a prior art drawing of a SCR $NO_x$ reduction system employing an ammonia storage tank for ammonia injection into the catalytic unit.
Figure 2A:
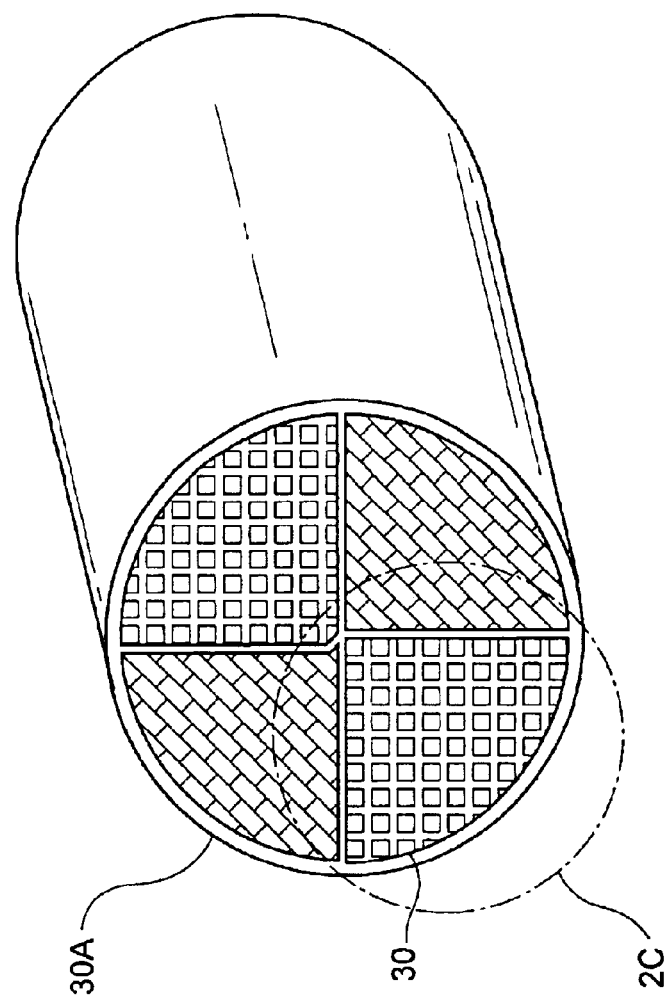
FIGS. 2A and 2B are prior art examples of substrates on which the catalyst can be washcoated to create catalytic units.
Figure 2C:
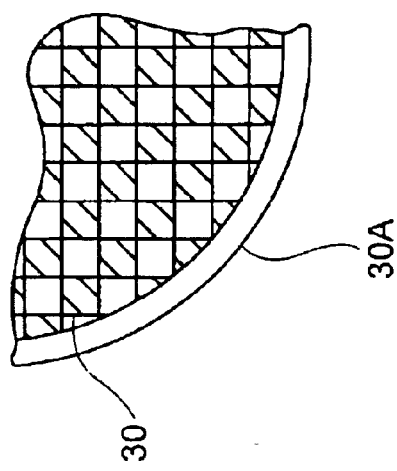
FIG. 2C is a magnified view to show the honeycomb structure of such substrates.
Figure 2B:
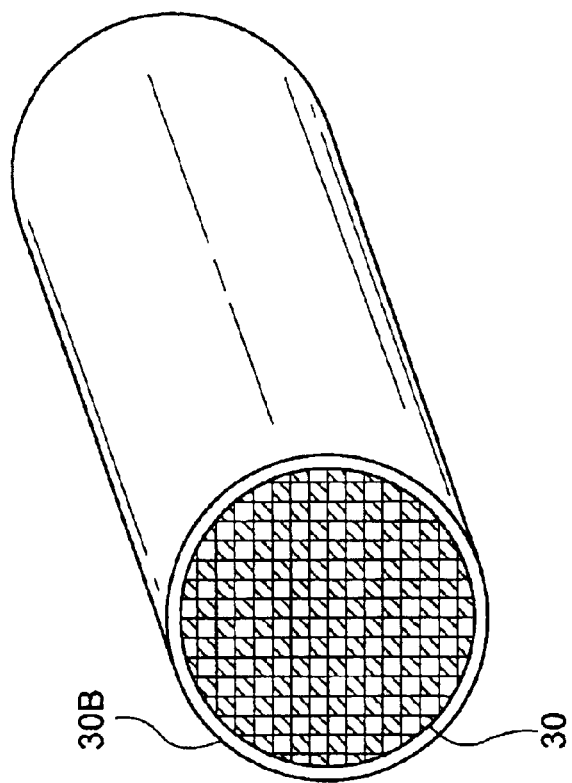

In some embodiments, the catalysts may be prepared as slurries and washcoated onto substrates to create catalytic units. Cordierite, a thermally rugged ceramic composed of magnesium oxide, silica, or alumina, is the most commonly used substrate material. Typically, an extrusion method is used to form numerous long, narrow channels in the substrates to give these substrates a "honeycomb" appearance. FIGS. 2A and 2B illustrate honeycomb structures of such honeycomb substrates, identified by reference numerals 30A and 30B, respectively. FIG. 2C shows an enlarged view of a portion of the honeycomb structure 30A. The honeycomb substrates are designed to provide high surface areas for catalytic reactions and to permit rapid temperature rises so that they can reach the optimal catalytic temperatures as quickly as possible. A washcoat, usually 25 to 40 $\mu m$ thick, is what converts these "bricks" of ceramic into an effective catalytic converter. The washcoat, or double washcoats in some cases, contains the catalytic materials that can generate $NH_3$ for use with SCR catalysts to convert $NO_x$ into benign gases.

In some embodiments, the catalyst may be supported on a carrier such as zeolite or alumina prior to washcoating onto the substrate. In other embodiments, such catalysts may be extruded with substrate materials to produce catalytic units without the need for washcoating. For use on motor vehicles, such catalytic units may be housed in steel cans that are connected to or form part of the vehicle exhaust system.

The following examples further illustrate the embodiments of the invention but are not intended to limit the scope of the invention as otherwise described herein.

Catalysts Based on Noble Metal Supported on Metal Oxides

The following examples all use Pt for easy comparison of relative activities of the different catalysts. Other noble metals such as Pd, Ir, Rh, and Ru also work, though Pt may give better results. In addition, the amounts of Pt in each of these examples is 2 percent by weight for easy comparison. It should be noted that the amount of noble metals in any of the various embodiments of the present invention will be determined by the desired efficiency and cost. In general, a higher percentage of noble metal will provide better efficiency, but at a greater cost. The preferred amounts of noble metal are between 0 percent and 50 percent, more preferably between 0 percent and 15 percent, and still more preferably between 0 percent and 5 percent.

While these examples mostly involve $Fe_2O_3$, other metal oxides may be used. Preferred metal oxides include $Fe_2O_3$, $Cr_2O_3$, MgO, $CeO_2$, $La_2O_3$, ZnO, and $TiO_x$.

EXAMPLE 1

A C1 catalyst is attained by impregnating $Fe_2O_3$ (support material) with 2 percent by weight (relative to support material) Pt. It should be noted that the amounts of Pt used in this and the following examples are for illustration purposes only. The present invention will work with other percentages of Pt. The impregnation is accomplished by mixing $(NH_3)_4Pt(NO_3)_2$ solution with $Fe_2O_3$ and stirring the mixture at room temperature for 2 hours. The resulting mixture is dried at 110° C., after which it is calcined in air at 600° C. for five hours. The dried material is then crushed and mixed with 10–15 percent colloidal alumina (binder), such as sold under trade name A1-20 by PQ Corporation (Baltimore, Md.), to make a slurry. The slurry is washcoated onto a one-inch (25 mm diameter×25 mm length) honeycomb substrate. Any substrate discussed above is suitable. However, a cordierite honeycomb substrate with a cell density of 400 cpsi was used in this example. The washcoated substrate is then dried and calcined for three hours at 600° C.

The C1 catalyst exhibited a 65 percent $NH_3$ generation activity with a synthetic hydrocarbon feed (see Table 1). When tested with diesel feed, the C1 catalyst effectively converted 83 percent of the $NO_x$ to $NH_3$. Both of these tests were performed at 490° C. However, the catalyst temperature was approximately 440° C. because the temperature of the catalytic unit is typically about 50° C. lower than the furnace temperature.

EXAMPLE 2

A C2 catalyst is made by first impregnating $Fe_2O_3$ with potassium (K) or cesium (Cs) and then impregnating the resulting mixture with Pt as described in Example 1. In this example, $Fe_2O_3$ is first mixed with 0.2 percent by weight potassium (from potassium nitrate, potassium acetate, or potassium hydroxide) or 0.3 percent by weight cesium (from cesium nitrate or cesium hydroxide). The resulting mixture is then stirred for 30 minutes, after which it is dried and calcined in air at 600° C. for three hours. The calcined mixture is then impregnated with Pt as described in Example 1.

The C2 catalyst was tested with a diesel feed and a hydrocarbon feed. When tested with diesel feed, the C2 catalyst effectively converted 90 percent of the $NO_x$ in the diesel exhaust to $NH_3$ (see Table 1). With a synthetic hydrocarbon feed, 72 percent of $NO_x$ was converted (see Table 1). These results were obtained despite the fact that the catalyst temperature was only about 435° C.

EXAMPLE 3

A C3 catalyst is made by impregnating a mixture of potassium and $Fe_2O_3$ and La-γ-β-$Al_2O_3$ with Pt. In this example, 0.3 percent by weight potassium and 2 percent by weight $Fe_2O_3$ are added to La-γ-β-$Al_2O_3$. The resulting mixture is stirred for two hours, and then dried at 110° C. The dried mixture is calcined in the air at 600° C. for five hours. The calcined mixture is crushed into a powder and 2 percent Pt is added in the form of $(NH_3)_4Pt(NO_3)_2$ solution to create a slurry. This slurry is then stirred for another two hours, after which it is dried at 110° C. and calcined at 600° C. for five hours. The calcined mixture is then crushed into powder and added to 15 percent colloidal alumina (binder) solution to create a slurry. The slurry is washcoated onto a honeycomb substrate and calcined as described in Example 1.

The C3 catalyst exhibited a lower activity even at higher temperatures than the C1 and C2 catalysts. With a diesel feed, 60 percent of $NO_x$ was converted into $NH_3$ (see Table 1). With a hydrocarbon feed, 69 percent of $NO_x$ was converted into $NH_3$ with a synthetic hydrocarbon feed (see Table 1). The tests were conducted at a catalyst temperature of approximately 500° C., which is still considerably lower than the operating temperatures for the catalytic converters known in the prior art.

EXAMPLE 4

A C4 catalyst is made by impregnating $Cr_2O_3$ (support material) with Pt. In this example, $Cr_2O_3$ is mixed with $(NH_3)_4Pt(NO_3)_2$ solution, which contains 2 percent Pt (by weight relative to $Cr_2O_3$). The resulting mixture is stirred at room temperature for 2 hours, and then dried at 110° C. The dried mixture is calcined in air at 600° C. for five hours. The calcined mixture is then crushed to make a first powder. A second powder is prepared from Cs and Pt impregnated $Fe_2O_3$ that has been prepared according to the procedure outlined in Example 2. Equal amounts of both first and second powders are mixed together in a volume of water equivalent to the total weight of both materials. The resulting mixture is dried at 110° C. and calcined in air at 600° C. for five hours. The calcined mixture is then crushed to make a third powder. A slurry is prepared from this third powder with 10–15 percent colloidal alumina (binder). Finally, the slurry is washcoated on a one-inch (25 mm diameter×25 mm length) cordierite honeycomb with a cell density of 400 cpsi. The washcoated substrate is dried at 110° C. and calcined for 3 hours at 600° C.

The activity of the C4 catalyst yielded interesting test results in that the activity for the hydrocarbon feed stream was significantly higher than that for the diesel stream. The C4 catalyst had an 88 percent activity with a hydrocarbon feed, while it only exhibited a 60 percent activity with the diesel feed (see Table 1). The tests were conducted at a catalyst temperature of 467° C.

EXAMPLE 5

A C5 catalyst is prepared by double-coating a ceramic substrate in a first washcoat prepared from copper-impregnated $Fe_2O_3$ and a second washcoat prepared from Cs- and Pt-impregnated $Fe_2O_3$. For the first washcoat, $Fe_2O_3$ is added to 2 percent by weight copper (from copper acetate) solution. The mixture is stirred at room temperature for 2 hours, and then dried at 110° C. The dried mixture is calcined in air at 600° C. for five hours. The calcined mixture is then crushed to make a first powder, which is mixed with 15 percent colloidal alumina (binder) to create a first slurry. A one-inch (25 mm diameter×25 mm length) cordierite monolith substrate is washcoated by applying thin layers of this slurry until 14 percent weight gain is realized. The 14 percent weight gain is selected for easy comparison between different experiments. It should be noted that the thickness of the catalyst coatings in practical applications will be related to the desired catalytic efficiency and cost. A wide range of percent weight gain of the substrate will work according to the present invention. It is often necessary to repeat the coating and drying (at 110° C.) of the slurry to achieve the desired thickness. The substrate, washcoated with the first slurry, is then dried at 110° C. and calcined at 600° C. for five hours.

For the second washcoat, $Fe_2O_3$ is mixed with 2 percent cesium (from cesium acetate) and 2 percent Pt (from $(NH3)_4Pt(NO_3)_2$) solution. The mixture is stirred at room temperature for two hours. The second washcoat is applied onto the dried, calcined monolith substrate until 14% weight gain is achieved. The double-coated substrate is again dried at 110° C. and calcined at 600° C. for five hours.

The C5 catalyst performed best with diesel feed. With diesel feed, the $NH_3$ generation activity was 95%. With synthetic hydrocarbon feed, the $NH_3$ generation activity was 70%. These are among the highest activities of all the catalysts tested. Note that the temperature of the catalyst is relatively low (approximately 467° C.), and yet $NH_3$ generation approached 100%.

EXAMPLE 6

A C6 catalyst is prepared by double-coating a ceramic substrate in a first washcoat prepared from nickel-impregnated $Fe_2O_3$ and a second washcoat prepared from Cs and Pt-impregnated $Fe_2O_3$. For the first washcoat, $Fe_2O_3$ is mixed with 2 percent nickel from nickel nitrate (or other nickel salt) solution. The resulting solution is stirred at room temperature for 2 hours, and then dried at 110° C. The dried mixture is calcined in air at 600° C. for five hours. This dried, calcined material is crushed to make a first powder, which is mixed with 15 percent colloidal alumina (binder) to create a first slurry. A one-inch (25 mm diameter×25 mm length) cordierite monolith substrate is washcoated by applying thin layers of the first slurry until 14 percent weight gain is realized. The monolith substrate is dried at 110° C., and then calcined at 600° C. for five hours.

For the second washcoat, $Fe_2O_3$ impregnated with Cs and Pt is prepared using the procedure outlined in Example 2. The second washcoat is then applied to the monolith substrate on top of the already dried, calcined first wasbcoat until 14 percent weight gain is achieved. The double-coated substrate is again dried at 110° C. and calcined at 600° C. for five hours.

The C6 catalyst showed a 65 percent $NH_3$ generation activity using both the hydrocarbon feed and the diesel feed (see Table 1). Note that the catalyst temperature, 392° C., was lower than that of most embodiments tested.

EXAMPLE 7

A C7 catalyst is prepared by double-coating a ceramic substrate in a first washcoat prepared from Ni- and Cu-impregnated $Fe_2O_3$ and a second washcoat prepared from Cs and Pt-impregnated $Fe_2O_3$. For the first washcoat, $Fe_2O_3$ is impregnated with 2 percent copper (from copper acetate) and 2 percent nickel (from nickel nitrate) solution. The resulting solution is stirred at room temperature for two hours, and then dried at 110° C. The dried mixture is calcined in air for five hours at 600° C. The calcined mixture is crushed to make a powder, which is then mixed with 15 percent colloidal alumina (binder) to create a slurry. A one-inch (25 mm diameter×25 mm length) cordierite monolith is washcoated by applying thin layers of the slurry to achieve 14 percent weight gain. The monolith is dried at 1110° C. and calcined at 600° C. for five hours.

For the second washcoat, $Fe_2O_3$ impregnated with Cs and Pt is prepared using the procedure outlined in Example 2. The second washcoat is then applied to the monolith substrate on top of the already dried, calcined first washcoat until 14 percent weight gain is achieved. The washcoated substrate is again dried at 110° C. and calcined at 600° C. for five hours.

The C7 catalyst showed 50 percent $NH_3$ generation activity using synthetic hydrocarbon feed and 80 percent $NH_3$ generation activity using diesel feed (see Table 1). The tests were conducted at a catalyst temperature 460° C.

EXAMPLE 8

A C8 catalyst is prepared by double-coating a ceramic substrate in a first washcoat prepared from Cu- and Zn-impregnated $Fe_2O_3$ and a second washcoat prepared from Cs and Pt-impregnated $Fe_2O_3$. For the first washcoat, $Fe_2O_3$ is mixed with 2 percent copper (from copper acetate) and 2 percent zinc (from zinc nitrate) solution. The resulting mixture is stirred at room temperature for 2 hours, and then dried at 110° C. The dried mixture is calcined in air at 600° C. for five hours. The calcined mixture is crushed to make a powder, which is then mixed with 15 percent colloidal alumina (binder). A one-inch (25 mm diameter×25 mm length) cordierite monolith is washcoated by applying thin layers of the above composition until 14 percent weight gain is realized.

For the second washcoat, $Fe_2O_3$ impregnated with Cs and Pt is prepared using the procedure outlined in Example 2. The second washcoat is then applied to the monolith substrate on top of the already dried, calcined first washcoat until 14 percent weight gain is achieved. The washcoated substrate is again dried at 110° C. and calcined at 600° C. for five hours.

The C8 catalyst yielded a high $NH_3$ generation activity of 90 percent with a diesel feed, but a rather low $NH_3$ generation activity of 30 percent with a hydrocarbon feed (see Table 1). The tests were conducted at a catalyst temperature of 373° C.

EXAMPLE 9

A catalyst C9 is made by impregnating $Fe_2O_3$ with Cu and Pt. In this example, $Fe_2O_3$ is mixed with 2 percent Pt (from $(NH_3)_4Pt(NO_3)_2$) and 2 percent copper (from copper acetate) solution. The resulting mixture is stirred at room temperature for two hours, and then dried at 110° C. The dried mixture is then calcined in air at 600° C. for five hours. The calcined mixture is crushed to make a powder, which is then mixed with 10–15 percent colloidal alumina (binder) to produce a slurry. The slurry is washcoated onto a one-inch honeycomb, dried at 110° C., and calcined for three hours at 600° C. prior to testing.

The C9 catalyst yielded results similar to that of the C8 catalyst. With diesel feed, the C9 catalyst achieved an 85 percent $NH_3$ generation activity (see Table 1). With synthetic hydrocarbon feed, the $NH_3$ generation activity was only 38 percent (see Table 1). The tests were conducted at a catalyst temperature of 443° C. (see Table 1).

EXAMPLE 10

A C10 catalyst is prepared by double-coating a ceramic substrate in a first washcoat prepared from Cu-impregnated $CeO_2$ and a second washcoat prepared from Cs and Pt-impregnated $Fe_2O_3$. For the first washcoat, $CeO_2$ is mixed with 2 percent Cu (from copper acetate) solution. The resulting mixture is stirred for two hours at room temperature, and then dried at 110° C. The dried mixture is calcined in air at 600° C. for five hours. The calcined material is crushed to make a powder, which is then mixed with 15 percent colloidal alumina (binder) to make a slurry. The one-inch (25 mm diameter×25 mm length) cordierite monolith is then washcoated with this slurry until a weight gain of 14% is achieved.

For the second washcoat, $Fe_2O_3$ impregnated with Cs and Pt is prepared using the procedure outlined in Example 2. The second washcoat is then applied to the monolith substrate on top of the already dried, calcined first washcoat until 14 percent weight gain is achieved. The washcoated substrate is again dried at 110° C. and calcined at 600° C. for five hours.

The C10 catalyst provided good results at relatively low temperature. At a catalyst temperature of 378° C., 80 percent $NH_3$ conversion was obtained with diesel feed as the reductant, while 58 percent $NH_3$ conversion was obtained using hydrocarbon feed.

EXAMPLE 11

A C11 catalyst was created to determine the effect of particle size of catalyst activity. In this example, nanosized particles of a support material were created by mixing 8 g of $Fe(CO)_5$ with 20 mL decalin and irradiating the resulting solution with a high intensity ultrasonic horn (at 20 kHz) at a temperature between 0 and 5° C. for 4 hours. $(NH_3)_4Pt(NO_3)_2$ (1.4 g), which had been dried overnight (15–20 hours) at 110° C., is added to the sonicated solution along with sufficient amount of colloidal alumina (binder) to make a 15 percent washcoat slurry. Then, 30 ml of a 50/50 mixture of isopropanol and 1-butanol is added to the slurry and stirred for one hour. A one-inch honeycomb substrate is washcoated with the material, dried at 110° C., and calcined in the air at 600° C. for three hours.

The C11 catalyst exhibited very high activity when tested with synthetic gases. The $NH_3$ generation activity was 85 percent for the synthetic feed and was 60 percent for the diesel feed. The lower activity of catalyst C11 when tested with diesel feed may be attributable to the increased charring of the nanosized particles by diesel.

Metal Oxide Promotion of $NH_3$ Generation

The following examples illustrate how catalytic activity can be enhanced (promoted) by metal oxides. The $NH_3$ generation activity of C13 and C14 catalysts in examples 13 and 14 below are contrasted with the $NH_3$ generation activity of C12 catalyst in example 12.

Example 12

The C12 catalyst is made by impregnation of $Al_2O_3$ with Pt. $Al_2O_3$ is first added to 4 percent Pt from $(NH_3)_4Pt(NO_3)_2$ solution. The resulting mixture is stirred well and then dried in an oven at 110° C. to 120° C. overnight (15–20 hours). The resulting dried powder is calcined at a ramp rate of 3° C./min to about 600° C. and held at that temperature for about 3 hours to obtain $Pt/Al_2O_3$. The calcined material is mixed with a binder, such as colloidal alumina, to create a slurry consisting of 90% powder and 10% binder. The slurry is then washcoated on an EX-20 substrate (1×1 inch), and the washcoated substrate is calcined in the air for 3 hours at 600° C. with a ramp rate of 3° C./min.

The C12 catalyst is used as a control to determine the effects of activity enhancement by metal oxides. The data presented in Table 2 illustrate performance of various catalysts with diesel injection rates of 1.75 mg/s or 1.4 mg/s. As is evident from the data in Table 2, the C12 catalyst performed poorly relative to the other catalysts. The maximum $NH_3$ generations with Catalyst 12 are 24.2 percent and 16.6 percent at 1.75 mg/s and 1.4 mg/s diesel injection rates, respectively.

EXAMPLE 13

The C13 catalyst is prepared by mixing 5% Ti (from soluble titanium salt) and 5 percent Fe (from soluble iron salt) in deionized water. Then, $Al_2O_3$ (support material) is added to the solution and stirred well until it is evenly suspended in the solution. The mixture is then dried in an oven at 110–120° C. overnight (15–20 hours) and calcined at 600° C. for three hours with a ramp rate of 3° C./min. The impregnated aluminum oxide is added to a $(NH_3)_4Pt(NO_3)_2$ solution containing 2 percent Pt. The resulting mixture is stirred well, dried in an oven at 110–120° C. overnight (15–20 hours), and then calcined at 600° C. with a ramp rate of 3° C./min. The calcined mixture is added to colloidal alumina to create a slurry with a 90 percent power and 10 percent binder. The slurry is then washcoated on an EX-20 substrate (1×1 inch) until 30–40% weight gain is achieved. After the washcoating step, the substrate is dried and calcined in air.

The C13 catalyst yielded higher $NH_3$ generation activities than that of the control C12 catalyst. The highest $NH_3$ generation activity achieved by this example is 57.7 percent at 550° C., which corresponds to a catalyst temperature of 500° C.

EXAMPLE 14

A C14 catalyst was made by mixing 1 percent Zn (from soluble zinc salt) and 1 percent Fe (from soluble iron salt) in deionized water. $Al_2O_3$ is then dispersed in the solution and mixed well. The resulting mixture is dried in an oven at 110–120° C. overnight (15–20 hours) and calcined at 600° C. for 3 hours with a ramp rate of 3° C./min. The impregnated aluminum oxide is added to a $(NH_3)_4Pt(NO_3)_2$ solution containing 2 percent Pt. This mixture is stirred well, dried in an oven at 110–120° C. overnight (15–20 hours), and then calcined at 600° C. with a ramp rate of 3° C./min. This calcined mixture is added to colloidal alumina (binder) to create a slurry with a 90 percent powder and 10 percent binder. The slurry is then washcoated on an EX-20 substrate (1×1 inch; EX-20 is a cordierite substrate from Coming Incorporated, Coming, N.Y.) until 30–40 percent weight gain is achieved. After the washcoating step, the substrate is dried and calcined in air for 3 hours at 600° C. with a ramp rate of 30C/min.

The C14 catalyst showed higher $NH_3$ generation activity in comparison to the C12 and C13 catalysts. At a diesel injection rate of 1.75 mg/sec, $NH_3$ was generated at 60.4 percent efficiency.

Catalysts Based on Perovskite Materials

The present invention also includes noble metal, e.g., Pt, supported on perovskite materials having a general formula of $ABO_3$, where A is rare earth and B is a transition metal. In such embodiments, noble metal replaces portions of the transition metal B in the perovskite materials. This results in an embodiment having a general formula of $AB_{1-x}M_xO_3$, where M is a noble metal. In the preferred embodiments, M is Pt, Pd, Ir, Rh, or Ru, and x is between 0 and 0.3. Lower level of substitution is preferred because it minimizes structural change in the perovskite materials. The following example using Pt as the noble metal illustrates one such embodiment.

EXAMPLE 15

A CIS catalyst containing a perovskite material, $LaMn_{0.9}Pt_{0.1}O_3$, was synthesized by the Pechini process to get a relatively high surface area. In this method, lanthanum nitrate and manganese nitrate are dissolved in a solution of $(NH_3)_4Pt(NO_3)_2$. Citric acid and ethylene glycol are added to the mixture to get a chelated complex. The ratio of citric acid to lanthanum and manganese is 1 to 1, e.g., two moles of citric acid to one mole of $LaMn_{0.9}Pt_{0.1}O_3$. The amount of ethylene glycol to add to the mixture is calculated by the following equation:

Weight of ethylene glycol=1.5×(weight of citric acid)×(density of ethylene glycol)

The chelated complex is heated to 90° C. to form a gel. Then the temperature is increased to 120° C., all the water and $NO_x$ fumes are removed, and the gel became a puffy powder. The puffy powder is fired at 450° C. for 4 hours to dry and remove carbon from the powder. After that, the dried, puffy powder is sintered at 700° C. or any desirable temperature to get the final product. The sintered powder is ball milled on a roller for a few days (2–5 days). The milled powder is then mixed with colloidal alumina to make a slurry for washcoating a substrate.

Figure 6:
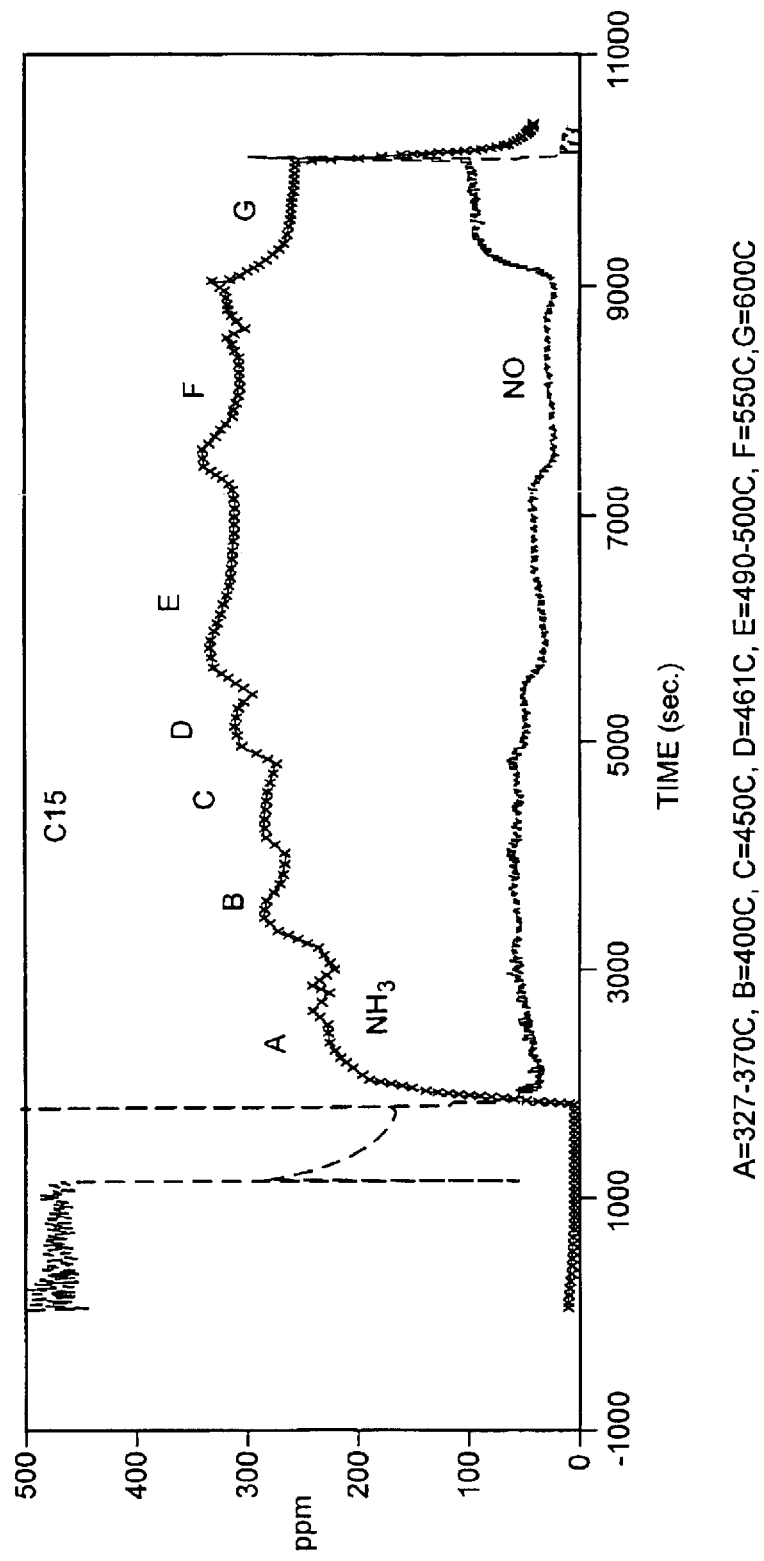
FIG. 6 is a graph of the $NH_3$ generation activity of a perovskite catalyst ($LaMn_{0.9}Pt_{0.1}O_3$) in accordance with another embodiment of the invention.

As shown in Table 2, the C15 catalyst yielded high activities at relatively low temperatures. For example, a 60 percent activity was achieved at approximately 400° C. in the presence of 6 percent oxygen. FIG. 6 illustrates the activity of this perovskite catalyst as a function of the temperature. This catalyst demonstrates the possibility to generate $NH_3$ at relatively low temperatures. The results of the durability test (in the presence of 10–12 percent $H_2O$, 6 percent $O_2$ and 40 ppm $SO_2$ for 50–100 hours) of this catalyst indicate that the activity decreases about 6 percent at low temperatures (400–450° C.) and 13–16 percent at high temperatures (500–550° C.).

Activity Tests

After the catalysts were prepared according to the disclosed methods, activity tests were performed with a stainless steel tubular reactor flow system to quantify the conversion of $NO_x$ to $NH_3$.

These activity tests were conducted by passing an inlet gas of known composition, similar to that expelled by an internal combustion engine, through the reactor. In the catalytic unit, $NH_3$ is generated by reduction of $NO_x$. The compositions of the outlet stream were measured and compared with those of the inlet stream to determine the amount of $NH_3$ generation. The percent $NH_3$ generation was calculated according to the following equation: $Y_{NH_3}\% = ([NH_3]/[NO_{x,in}]) \times 100$, where $[NH_3]$ is the concentration of $NH_3$ in the outlet stream and $[NO_{x,in}]$ is the concentration of $NO_x$ in the inlet stream. The analysis of $NH_3$, NO, $N_2O$, CO, $CO_2$, $H_2O$ in the inlet and outlet gas streams was performed using a Nicolet 560 Gas FTR (Fourier Transform Infrared Spectrometer) equipped with a Mercury Cadmium Telluride (MCT) detector. This detector can detect concentrations in the ppm range. FTIR is capable of determining concentrations for a variety of interested compounds simultaneously and is effective in identifying the multiple components in the gas stream. The effluent gases in this case were monitored at 4 $cm^{-1}$ resolution. The bench unit is equipped with an injector for supplying diesel as well as an inlet for supplying synthetic hydrocarbons.

Prior to measuring the activities of the disclosed embodiments, it is important to calibrate the equipment and get a baseline reading. To accomplish this, a pristine, one inch (25 mm×25 mm) honeycomb substrate sample was loaded in the reactor and a background measurement is collected. After this correction, samples were prepared and tested according to the methods described below.

Most samples were tested multiple times with different simulated exhaust compositions. First, for the generation of $NH_3$ using synthetic hydrocarbons, a simulated exhaust gas with a composition of 0.77% $O_2$, 14% $CO_2$, 1000 ppm $NO_x$, 1000 ppm CO, 333 ppm $C_3H_6$, 167 ppm $C_3H_8$, 0.33% $H_2$, 23 ppm $SO_2$ and 10–12% $H_2O$ is used. This composition of gases represents a 1.2 redox ratio. The data collected from this series of experiments, identified as Phase 1, are represented in parentheses in Table 1. The gas flow was balanced with nitrogen to give a total flow rate of 7508 mL/min. This flow rate corresponds to a space velocity (SV) of 35,000 $h^{-1}$ because space velocity equals the flow rate divided by the volume of the catalyst unit.

Figure 4:
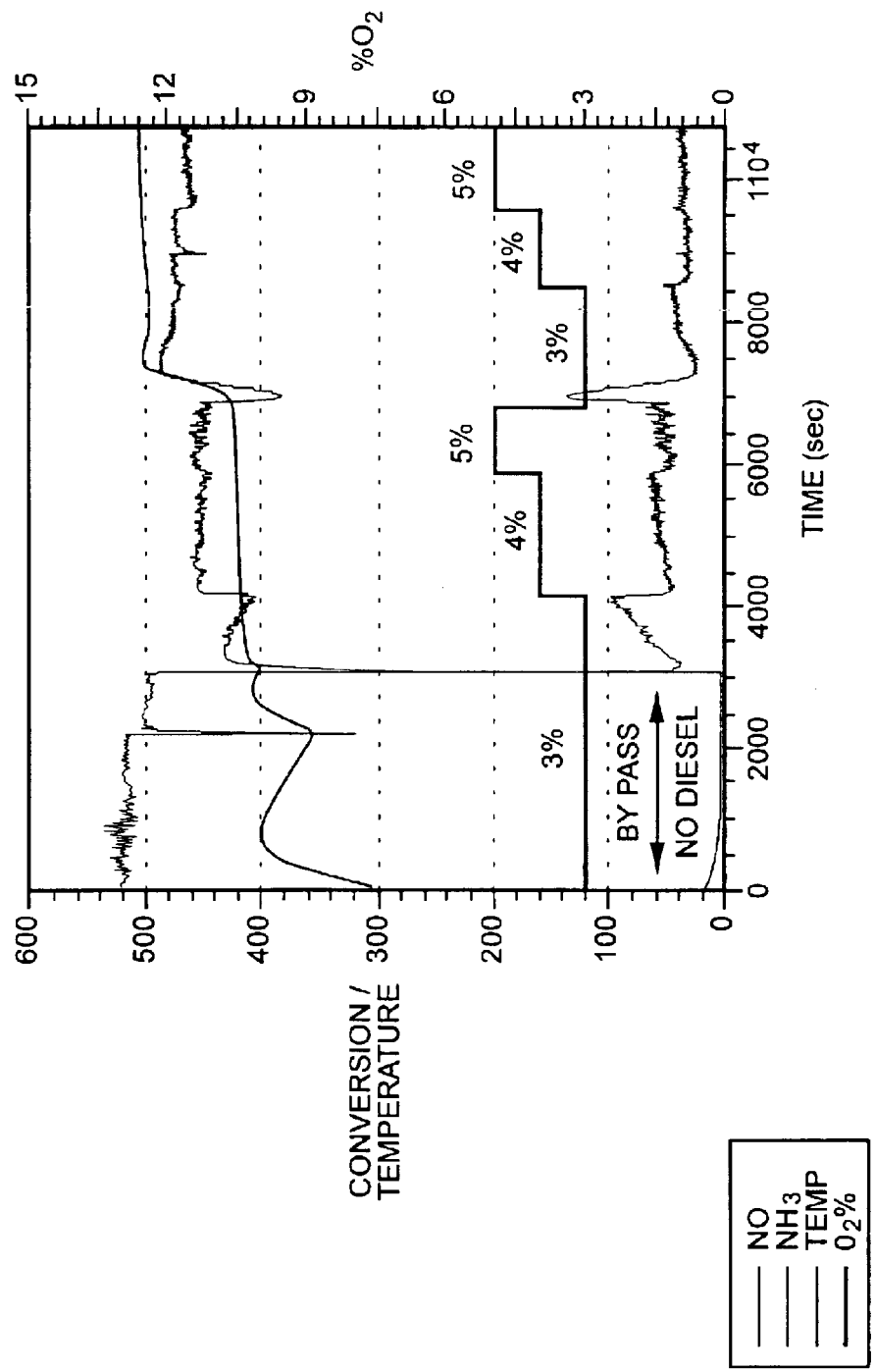
FIG. 4 is a graph illustrating $NH_3$ generation activity of a $Pt/Fe_2O_3$ catalyst in accordance with one embodiment of the invention.
Figure 5:
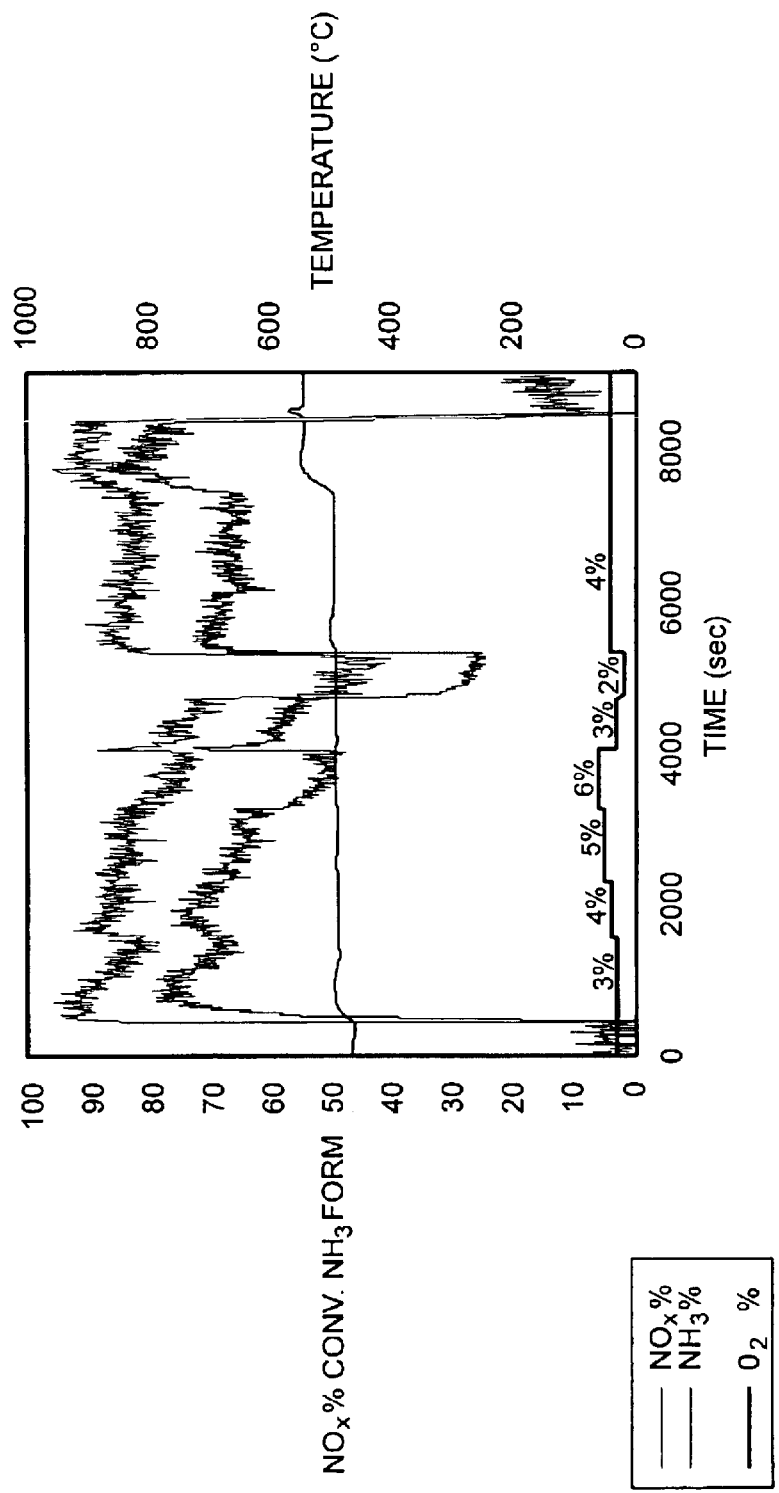
FIG. 5 is a graph of $NH_3$ generation activity of a $Cu/Zn/Fe_2O_3$ catalyst in accordance with another embodiment of the invention.

Because $NH_3$ conversion at low temperatures is an important feature of the disclosed embodiments, it is necessary to test the catalyst samples over a broad temperature range (from 60 to 600° C.) to prove their applicability to mobile internal combustion engines. The ramping rate was set at 8.5° C./min until it reached 600° C.; then, this temperature was maintained for 15 minutes. FIGS. 4 and 5 illustrate the test data generated over this broad temperature range.

While there is interest in the control of $NO_x$ emission from gasoline engines, the interest for mobile diesel engines is even greater because there is no effective control of $NO_x$ emission from diesel engines. Thus, the $NH_3$ generation activities of these catalysts were also tested with diesel input. In this case, the diesel input stream was composed of 3–6% $O_2$, 14% $CO_2$, 500–1000 ppm $NO_x$, 350 ppm CO, and 10–12% $H_2O$. The injection nozzle opening was set to oscillate at 0.003, 0.0035 or 0.004 cycles, i.e., the nozzle was cycled to open for 3, 3.5, or 4 seconds per 1000 seconds of time. These frequencies correspond to 1.4, 1.75, and 2.2 mg of diesel/sec, respectively. The gas flow was balanced with nitrogen to give a total flow of 4290 ml/min, which corresponds to a space velocity (SV) of 20,000 $h^{-1}$.

TABLE 1

Comparison of $NH_3$ Activity for the Catalysts in Examples 1–11

| Catalyst # | Catalyst (Metal-Support) | Max. $NH_3$ Activity % (Phase 1: synthetic gas activity) | Furnace Temperature ° C. | $O_2$ % | Diesel Injection Rate (mg/sec) |
|---|---|---|---|---|---|
| C1 | Pt-$Fe_2O_3$ | 83 (65) | 490 | 3 | 1.4 |
| C2 | K,Pt-$Fe_2O_3$ | 90 (72) | 485 | 4 | 1.4 |

TABLE 1-continued

Comparison of $NH_3$ Activity for the Catalysts in Examples 1–11

| Catalyst # | Catalyst (Metal-Support) | Max. $NH_3$ Activity % (Phase 1: synthetic gas activity) | Furnace Temperature °C. | $O_2$ % | Diesel Injection Rate (mg/sec) |
|---|---|---|---|---|---|
| C3 | K,Pt-$Fe_2O_3$/$La_2O_3$-$19Al_2O_3$ | 60 (69) | 550 | 4 | 1.4 |
| C4 | Cs, Pt-$Fe_2O_3$:Pt-$Cr_2O_3$ | 60 (88) | 517 | 3 | 1.4 |
| C5 | Cs, Pt $Fe_2O_3$/Cu, $Fe_2O_3$ | 95 (70) | 517 | 4 | 1.4 |
| C6 | Cs, Pt $Fe_2O_3$/Ni, $Fe_2O_3$ | 65 (65) | 442 | 4 | 1.4 |
| C7 | Cu(II),Ni $Fe_2O_3$/Pt, Cs, $Fe_2O_3$ | 80 (50) | 510 | 4 | 1.4 |
| C8 | Cu(II), Zn, $Fe_2O_3$/Pt, Cs, $Fe_2O_3$ | 90 (30) | 423 | 5 | 1.4 |
| C9 | Cu(II) $Fe_2O_3$/Pt | 85 (38) | 493 | 5 | 1.4 |
| C10 | Pt, $CeO_2$/Cs, Pt-$Fe_2O_3$ | 80 (58) | 428 | 5 | 1.4 |
| C11 | Pt-$Fe_2O_3$ nanosize | 60 (85) | 494 | 4 | 1.4 |

Data presented in Table 1 include activities of the disclosed embodiments using diesel input and synthetic hydrocarbon feed (data for hydrocarbon feed are shown in parenthesis). Most of the catalysts in Table 1, with a few exceptions, exhibit better activity with diesel than with the synthetic hydrocarbons feed. Note that the high activity catalysts all contain $Pt/Fe_2O_3$ as a component. Data with diesel feed were gathered only at an input rate of 1.4 mg of diesel/sec. Typically, for a test involving 3–4% $O_2$, the injector was set to operate at 0.003 cycles, and 0.0035 cycles for a test with a 6% $O_2$ composition. Table 1 also shows $NH_3$ generation activities of these catalysts as a function of temperature. FIGS. 4 and 5 also illustrate the responses of these catalysts to varying levels of $O_2$ in the input stream.

Catalysts C12–C15 were tested in a slightly different fashion than those discussed above. These catalysts were tested with a simulated diesel exhaust gas as described above. The injection rates for these test are either 1.4 mg/s or 1.75 mg/s. The results are shown in Table 2. Catalyst C12 was used as a control to demonstrate the activity enhancement (promotion) by metal oxides. Note that the catalyst 12 achieved a $NH_3$ generation activity only as high as 24.2 percent, while the other catalysts (catalyst C13 and C14) which used metal oxides as a promotor achieved much higher activities. This observation is consistent with the notion that ammonia generation may be enhanced by metal oxides that are capable of partially cracking diesel into lighter and efficient reductants. Examples of such metal oxides include Fe, Zn, Cu, Mo, Co, Ti, Ni, Cr, and V oxides or their combinations. In general, a suitable pre-cracking catalyst may be used to partially crack the diesel fuel into light and efficient reductants so as to enhance the $NH_3$ generation activity of the preferred catalyst and possibly reduce the light-off temperature.

TABLE 2

Comparison of $NH_3$ Activity for the Catalysts in Examples 12–15

| Catalysts # | Catalysts composition | $NH_3$ % | Furnace Temp. (°C.) | $O_2$ % | Diesel injection Rate (mg/s) | Total $NO_x$ conversion %∂ |
|---|---|---|---|---|---|---|
| C12 | 4%Pt/$Al_2O_3$ | 16 | 450 | 6 | 1.75 | 51.9 |
| | | 19.6 | 500 | | | 52.3 |
| | | 23.5 | 550 | | | 55.9 |
| | | 24.2 | 600 | | | 57.3 |
| | | 15.2 | 450 | 6 | 1.4 | 45.6 |
| | | 16.6 | 500 | | | 45 |
| | | 15.2 | 550 | | | 43.7 |
| | | 15.2 | 600 | | | 46 |
| C13* | 2%Pt/5%$TiO_x$-5%$Fe_2O_3$/$Al_2O_3$ | 47.7 | 450 | 6 | 1.75 | 71.6 |
| | | 47.7 | 500 | | | 78.3 |
| | | 57.7 | 550 | | | 86.9 |
| | | 50.7 | 600 | | | 88.4 |
| C14 | 2%Pt/1%ZnO-1%$Fe_2O_3$/$Al_2O_3$ | 50.3 | 450 | 6 | 1.75 | 76.2 |
| | | 56.2 | 500 | | | 77.4 |
| | | 604. | 550 | | | 82.8 |
| | | 59.6 | 600 | | | 86.1 |
| C15 | $LaMn_{0.9}PtO_{.1}O_3$ | 48 | 327–370 | 6 | 1.75 | 90 |
| | | 60 | 400 | | | 87 |
| | | 60.3 | 450 | | | 88.8 |
| | | 65.5 | 461 | | | 90 |
| | | 71.66 | 490–500 | | | 93.5–91.8 |
| | | 66–71 | 550 | | | 94–95 |
| | | 55.5 | 600 | | | 80 |

*This catalyst contains $TiO_x$, which is a non-stoichiometric titanium oxide. In this formula, x is less than 2.
∂Total $NO_x$ conversion includes generation of $NH_3$ and other products (e.g., $N_2$).

Durability Tests

Also important for successful application of the disclosed embodiments is the ability to withstand harsh "environments" in the exhaust systems of internal combustion engines. Inside a catalytic converter, water and many contaminants can impede or degrade a catalyst's performance. Therefore, these catalysts were also tested for durability with a simulated exhaust environment. The durability of the catalysts C1 and C5 was evaluated by aging the catalysts for 60 hours at 600° C. in the presence of a gas containing 40 ppm $SO_2$, 10–12% $H_2O$ and 6% $O_2$ to simulate the interior of a catalytic converter. After the aging process, these catalysts were re-tested according to the above method to determine whether their $NH_3$ generation activities had been impaired. The decrease in efficiency of Catalysts C1 and C5 for $NH_3$ generation was found to be less than 10%. These tests show the applicability of the disclosed embodiments in the conversion of $NO_x$ in motor vehicle exhaust gas.

Advantages of the present invention may include one or more of the following. These catalysts exhibit high activities for the generation of $NH_3$ using exhaust gases under excess oxygen conditions. These catalysts can be used in diesel, gasoline, and synthetic hydrocarbon applications. Furthermore, the amounts of $NO_2$ and $N_2O$ produced by these reactions are minimal. Ammonia can be generated at relatively low temperatures using these catalysts. Sulfur aging does not significantly impede the performance of these catalysts. Furthermore, these catalysts may be extruded with the support materials to make the catalytic units. In such a case, the catalytic unit will have more catalysts than the washcoated versions. More catalysts will likely lead to better performance.

Enhanced performance can be achieved through the use of a high pressure diesel injector, which atomizes the fuel. This is apparent from the fact that diesel injection at 1.4 mg/s (the lowest rate achievable with our setup) gives better results than at 1.75 mg/s or 2.2/s. Lower diesel injection rate may also reduce the charring of the catalysts, especially those with very fine particle sizes. Additionally, the particle size of the catalyst affects its efficiency: the finer the particle size, the better the efficiency. The perovskite compound disclosed above was prepared by the Pechini method, which does not produce surface area as high as do other methods. Further increase in surface area is possible and performance of these catalysts may be improved by increasing the surface area. Finally, ammonia generation may be enhanced by metal oxides that are capable of partially cracking diesel into lighter and efficient reductants. Examples of such metal oxides include Fe, Zn, Cu, Mo, Co, Ti, Ni, Cr, and V oxides or their combinations. Those skilled in the art will appreciate that the present invention also may include other advantages and features.

While the present invention has been described and illustrated herein by reference to a limited number of embodiments, numerous variations and modifications are possible. Therefore, it is intended that the invention be limited only by the claims that follow.

What is claimed is:

1. A catalyst for converting $NO_x$ in exhaust gases to $NH_3$ comprising:

at least one compound represented by a formula $AB_{1-x}M_xO_3$, wherein A is a rare earth metal, B is a transition metal, M is a noble metal, and wherein x is in a range from 0 to 0.3.

2. The catalyst of claim 1, wherein A comprises lanthanum.

3. The catalyst of claim 1, wherein B comprises manganese.

4. The catalyst of claim 1, wherein M comprises platinum.

5. The catalyst of claim 1, wherein A comprises lanthanum, B comprises manganese, and M comprises platinum.

* * * * *